US006978511B2

(12) United States Patent
Poton

(10) Patent No.: US 6,978,511 B2
(45) Date of Patent: Dec. 27, 2005

(54) MOTOR VEHICLE WINDSCREEN WIPER COMPRISING A SAFETY CLASP

(75) Inventor: Eric Poton, Pont du Château (FR)

(73) Assignee: Valeo Systemes d'Essuyage, La Verriere (FR)

( * ) Notice: Subject to any disclaimer, the term of this patent is extended or adjusted under 35 U.S.C. 154(b) by 23 days.

(21) Appl. No.: 10/491,819

(22) PCT Filed: Oct. 2, 2002

(86) PCT No.: PCT/FR02/03350

§ 371 (c)(1),
(2), (4) Date: Apr. 6, 2004

(87) PCT Pub. No.: WO03/033316

PCT Pub. Date: Apr. 24, 2003

(65) Prior Publication Data

US 2004/0244137 A1    Dec. 9, 2004

(30) Foreign Application Priority Data

Oct. 15, 2001  (FR) .................................. 01 13831

(51) Int. Cl.[7] .............................. B60S 1/40; B60S 1/38
(52) U.S. Cl. ............................... 15/250.32; 15/250.43; 15/250.001
(58) Field of Search ...................... 15/250.32, 250.43, 15/250.44, 250.001, 250.451; 403/213, 101, 403/23

(56) References Cited

U.S. PATENT DOCUMENTS 4,670,934 A * 6/1987 Epple et al. ............. 15/250.32
5,145,274 A * 9/1992 Schon ......................... 403/79
5,611,103 A * 3/1997 Lee ........................... 15/250.32
5,920,950 A * 7/1999 Young et al. ............. 15/250.32
6,263,538 B1 * 7/2001 Westermann et al. ..... 15/250.32

FOREIGN PATENT DOCUMENTS

| DE | 3618326 | * 12/1987 | |
|----|---------|-----------|---|
| DE | 4323767 | * 1/1994 | |
| EP | 0655373 | * 11/1994 | |
| FR | 2482914 | * 5/1980 | |
| FR | 2 740 090 A1 | 4/1997 | ............. B60S 1/40 |
| GB | 2019203 | * 10/1979 | |
| GB | 2 324 463 A | 10/1998 | ............. B60S 1/40 |
| GB | 2 348 118 A | 9/2000 | ............. B60S 1/40 |

* cited by examiner

Primary Examiner—Gary K. Graham
(74) Attorney, Agent, or Firm—Osha Liang LLP

(57) ABSTRACT

A motor vehicle windscreen wiper of the type with a windscreen wiper brush which is articulated to a windscreen wiper arm. Moreover, the inventive wiper is of the type in which a connector is inserted longitudinally, from rear to front, inside the front end of the arm, said front end being bent back. Moreover, the connector, which is disposed between the arm and a brush component, has an elastically-deformable element that is used to block said connector in the inserted position. Furthermore, the wiper is of the type in which the connector includes two longitudinal edges which are received between two lateral flanges of the brush component. The invention is characterised in that it includes a safety clasp which is movably mounted between a closed position, in which said clasp extends opposite the blocking element in order to lock the connector in the inserted position, and an open position, which is used to release said connector.

20 Claims, 3 Drawing Sheets

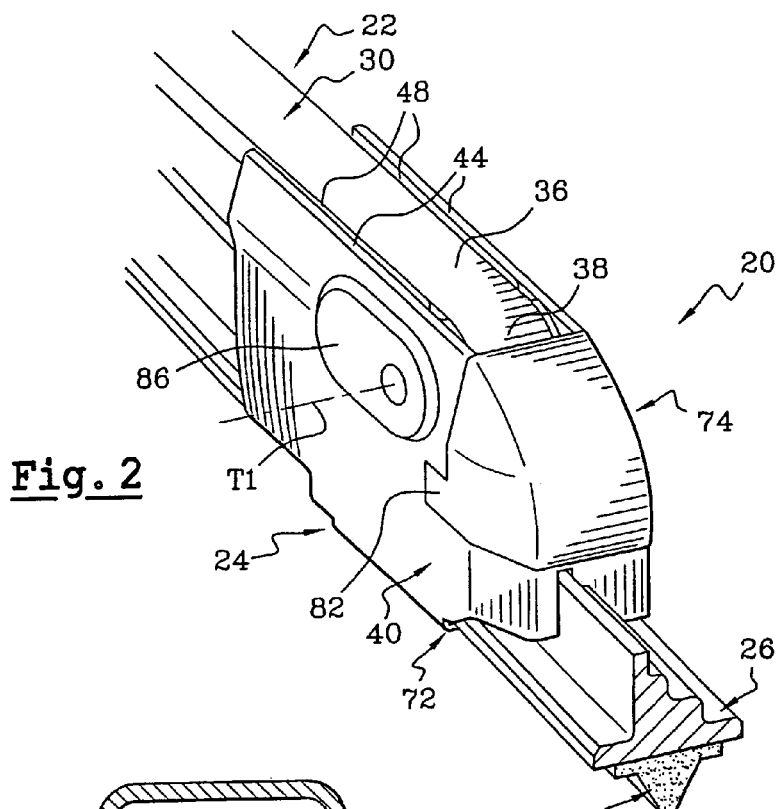
Fig. 2
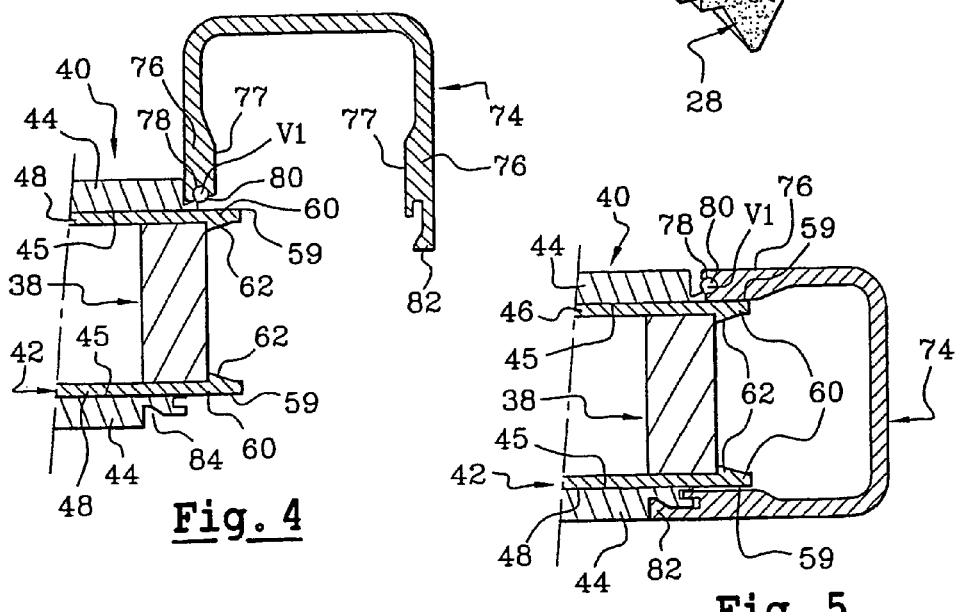
Fig. 4
Fig. 5

MOTOR VEHICLE WINDSCREEN WIPER COMPRISING A SAFETY CLASP

CROSS-REFERENCE TO RELATED APPLICATIONS

This application is a national stage application based on International Application No. PCT/FR02/03350 filed Oct. 2, 2002.

FIELD OF THE INVENTION

The invention concerns a motor vehicle wiper.

The invention concerns more particularly a motor vehicle wiper of the type comprising a wiper blade mounted articulated about a transverse axis on the longitudinal front end of a wiper arm, of the type in which a mounting and articulation connector is interposed between the arm and a blade component, of the type in which the connector is engaged longitudinally from rear to front inside the front end of the arm which is curved longitudinally towards the rear in the form of a U, and in which the connector comprises at least one elastically deformable element for securing the connector in the engaged position inside the front end of the arm, and comprises two longitudinal vertical flanks which are designed to be received between two lateral wings of the blade component.

BACKGROUND OF THE INVENTION

It is known to use such a method of assembling the blade on the arm.

The connector is generally elastically fitted on a transverse rod connecting the two longitudinal wings of the components so as to be able to pivot about it, and the front longitudinal end of the arm is curved longitudinally in the form of a U so as to engage between the two flanks of the connector, about a central web with a complementary shape of the connector.

The securing in position of the connector is, in general terms, provided by an elastically deformable element. However, it may happen that, under the effect of an impact, the blade is pushed violently. The securing element is not sufficiently strong and deforms. It can no longer fulfil its securing function, thus allowing accidental disengagement of the connector and thereby a disconnection of the blade from the wiper arm.

According to a design aimed at producing low height wipers, the articulated structure of the wiper blade which carries the wiper scraper or rubber is omitted and it is for example the vertebrae, or structural reinforcing elements analogous to vertebrae, which are associated with the flexible wiper rubber in order to constitute the wiper blade proper, also referred to as a "flat blade".

This low height blade is also driven in sweep by a suitable mechanism comprising a wiper arm and, given the low height of the structural elements, the connector is fitted on a rod of a component which is an insert piece mounted to the structure of the blade.

There exist many embodiments of insert pieces, such as for example those described and depicted in the document WO-A-00/21811. However, each of these insert pieces can receive only a particular wiper arm profile which is adapted to it.

Thus, whenever one wishes to mount a wiper blade of the "flat blade" type on a conventional vehicle which comprises a standard wiper arm, this mounting is impossible or at the very least requires a specific mounting and articulation assembly, of which all the components are specific.

SUMMARY OF THE INVENTION

The object of the invention is therefore to propose a means of fixing the connector to a blade component which allows to lock the connector in the mounted position and which allows to mount any type of wiper on a standard arm and connector.

For this purpose, the invention proposes a wiper of the type described above, characterised in that it comprises a safety fastener mounted to be movable between a closed position in which it extends with regard to the securing element in order to prevent its elastic deformation and lock the connector in the engaged position in the arm, and an open position allowing the disengagement of the connector from the hook-shaped end of the arm.

According to other characteristics of the invention:
- the fastener is mounted to be movable with respect to the blade component;
- the fastener is mounted articulated with respect to the blade component;
- the fastener is mounted articulated about a substantially vertical axis of the blade component;
- the articulation axis of the fastener is situated close to the front longitudinal end of one wing of the component;
- the fastener is held in the closed position by elastic fitting together of complementary shapes;
- the securing element is a lug which extends freely and longitudinally towards the front from the front longitudinal end of one flank of the connector, and whose free end comprises a securing nose which extends transversely towards the inside of the connector and which extends with regard to the front side of the front longitudinal end of the arm when the connector is in the engaged position;
- the fastener forms a cap which extends in a closed position with regard to an external lateral face of the free end of the locking lug of the connector;
- the component is an insert piece mounted on a support structure of the wiper rubber of the blade;
- the component is a portion of the main yoke of an articulated support structure for the wiper rubber of the blade;
- one of the wings of the component of the blade receives, on an external face, an indicator of the aging of the blade which is initially covered with a protective film which is removed, at least partially, automatically, when the fastener is opened.

Other characteristics and advantages of the invention will emerge from a reading of the following detailed description, for an understanding of which reference will be made to the accompanying figures, amongst which:

BRIEF DESCRIPTION OF THE DRAWINGS

FIG. 2 is a perspective view similar to that of FIG. 1 in which the fastener is in the closed position;

FIG. 4 is a longitudinal section of the wiper according to the invention along a horizontal plane showing the securing of the connector in the engaged position on the inside of the arm;

FIG. 5 is a section similar to that in FIG. 4, in which the fastener is in the closed position.

DETAILED DESCRIPTION

Figure 1:
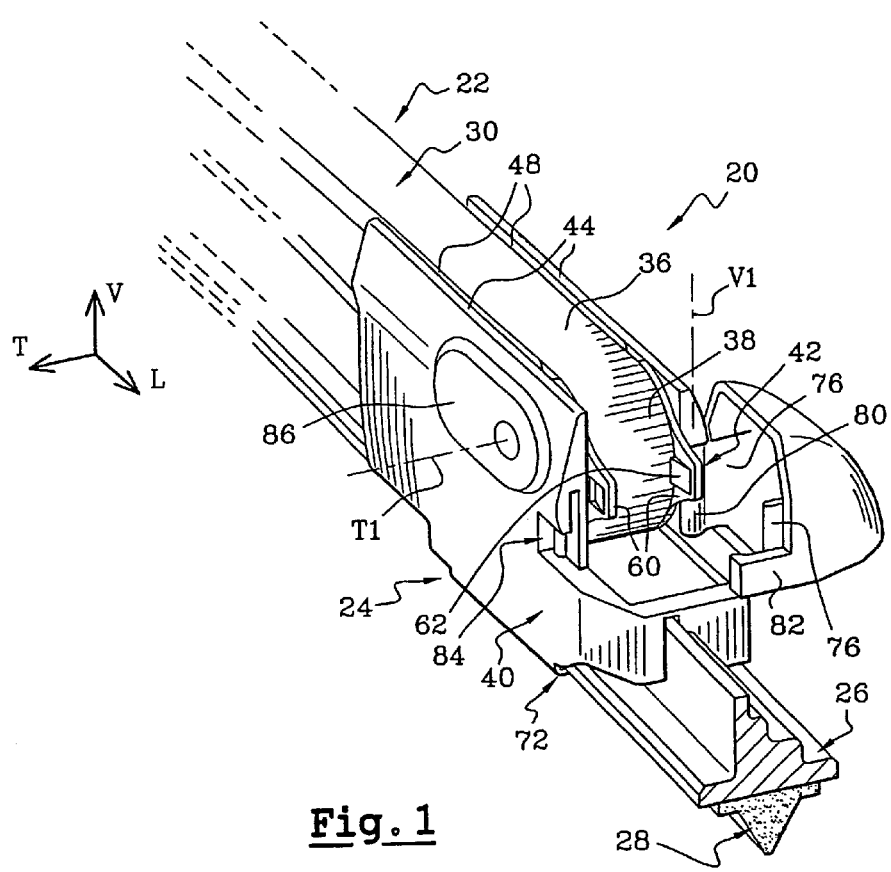
FIG. 1 is a perspective view of a wiper according to the invention in which the fastener is in the open position.
Figure 3:
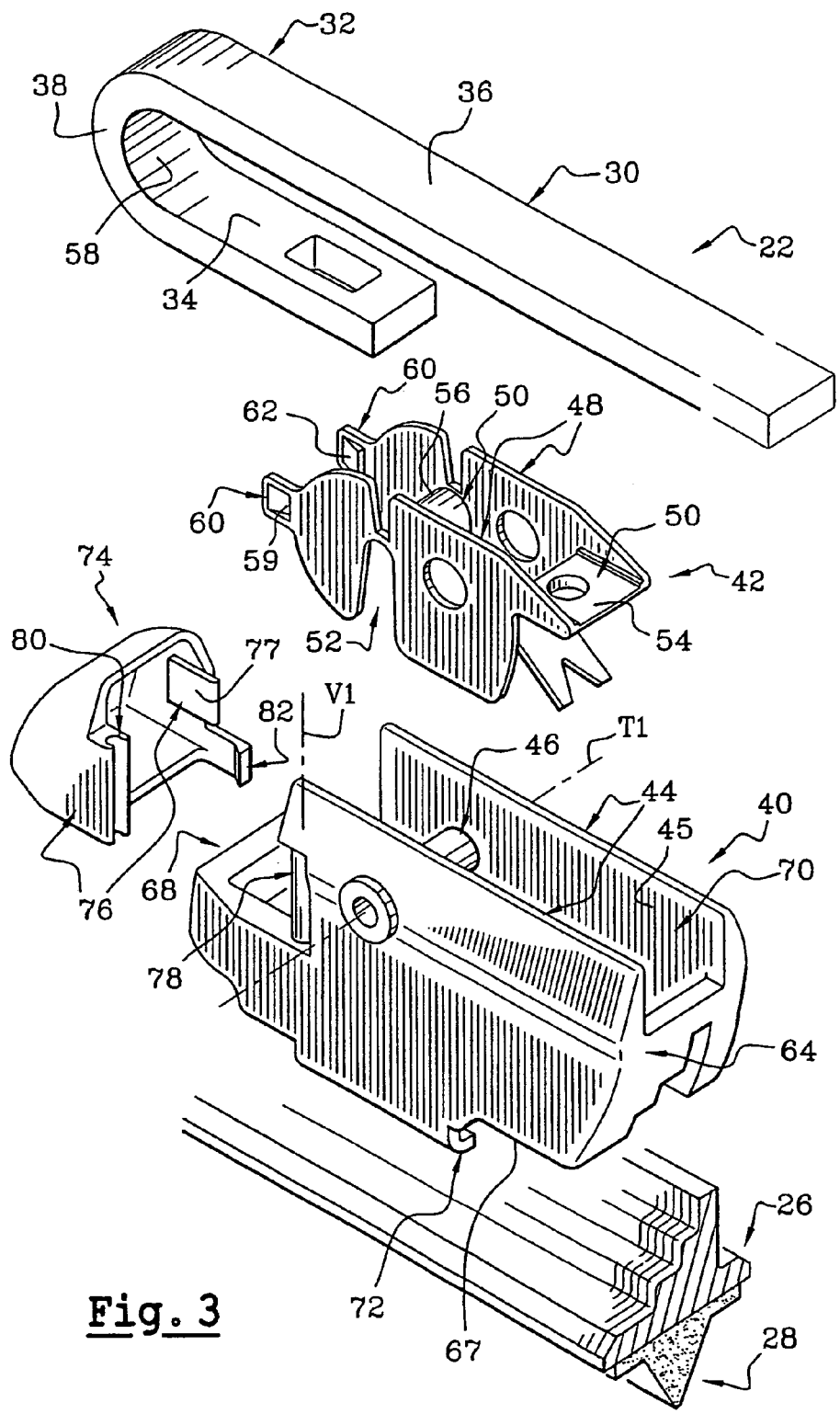
FIG. 3 is an exploded perspective view of the wiper.

For the description of the invention, the orientations vertical, longitudinal and transverse will be adopted non-limitingly according to the reference V, L, T indicated in FIG. 1.

In the following description, identical, similar or analogous elements will be designated by the same reference numbers.

As can be seen in particular in the figures, the main elements and components of the wiper have an overall symmetry of design with respect to a median vertical and longitudinal plane, symmetrical elements being designated by the same references.

The figures show the main components of a wiper 20 produced in accordance with the teachings of the invention.

The wiper 20 comprises principally an arm 22, and a blade 24 consisting in particular of a support structure 26 and a wiper rubber 28.

The wiper arm 22 consists of a flat metallic rod 30 which extends in the overall longitudinal direction "L" of the arm 22 and of the wiper blade 24. The front free end 32 of the arm 22 is in the form of a hook angled in a U and consists of a lower longitudinal branch 34, a top longitudinal branch 36 and a curved connecting branch 38 which extends approximatively over a semicircle.

The blade 24 is here a wiper blade of the "flat blade" type, that is to say a low height wiper blade. The function of the support structure 26 is firstly to press the wiper rubber 28 against the window to be wiped and secondly to drive it in alternating sweeps between two extreme sweep positions in order to wipe the window.

The support structure 26 carries a connecting component 40 which receives means of connection and articulation on the end 32 of the arm 22 about a transverse axis "T1" of a known type which consists principally of a connector 42.

The component 40, which will be described below in detail, comprises mainly two longitudinal and vertical wings 44 connected by a transverse articulation rod 46.

The connector 42 comprises essentially two parallel lateral flanks 48 connected together by a transverse web 50. It is intended to be received between the two internal faces 45 of the wings 44 of the component 40 of the wiper blade 24, and to fit elastically on the articulation rod 46.

To this end, the connector 42 comprises, in each of its flanks 48, a slot 52, substantially vertical and arranged substantially at the centre of the connector 42.

Thus the connector is engaged from top to bottom, between the two wings 44 of the wiper blade 24, until the articulation rod 46 is elastically engaged at the bottom of the slots 52 of the connector 42.

In a known manner, the transverse web 50 which connects the two parallel flanks 48 of the connector 42 has a convex profile complementary to the concave internal profile of the end 32 in the form of a U-shaped hook of the wiper arm 22. The web comprises a first horizontal flat portion 54 which extends longitudinally towards the rear and a second curved front portion 56 intended to at least partially cover the articulation rod 46 and whose shape is complementary to that of the internal face 58 of the curved branch 38 of the hook 32.

The rod 46 provides the articulated mounting of the connector 42 with respect to the wiper blade 24 about the transverse axis "T1".

After having engaged the connector 42 on the rod 46, the assembly of the wiper arm 22 on this sub-assembly 42, 46 takes place, in a known way, by engaging, longitudinally from front to rear, the hook-shaped end 32 on the web 50 of the connector 42, the parallel lateral faces of the rod 30 being received between the flanks 48 of the connector 42.

In such a type of assembly, means of securing by elastic fitting together are provided which longitudinally secure the connector 42 with respect to the arm 22 when the connector 42 is mounted in the engaged position in the hook-shaped end 32.

These automatic securing means consist of two lugs 60 which are each carried by a flank 48 of the connector 24.

Each lug 60 extends longitudinally towards the front from the front edge of the flank 48 which carries it. The free end 62 of this lug 60 is in the form of a nose extending transversely towards the inside of the connector 42 and which is intended to cooperate with the convex face of the curved branch 38 of the hook-shaped end 32.

The component 40 is a piece moulded from a plastics material, with a rectangular parallelepipedal overall shape, which can be produced in one or two parts.

It consists of two parallel lateral wings 44, a rear end 64 and a horizontal flat base 66.

The front face 68 and the top face 70 of the component are open to allow mounting of the connector 42, followed by the arm 22.

The lower face 67 of the base 66 receives connection means for the component 40. These connection means comprise slides 72 which are intended to receive the support structure 26 and which enable the component 40 to be mounted on the support structure 26 by means of a longitudinal sliding. The connection means also comprise means for longitudinal locking of the mounting (not shown in detail), such as for example a locking by elastic fitting together of complementary shapes.

After having fitted the connector 42 in the component 40, the connector 42 is engaged inside the hook-shaped end 32. When the connector 42 is engaged, the lugs 60 deform elastically outwards, because of the inclined shape of the internal lateral faces 61 of the lugs 60, to allow passage of the arm 22 and, when the connector 42 is engaged in the arm 22, the lugs 60 resume their state of rest in order to provide the longitudinal securing of the connector 42 in the engaged position inside the hook 32.

The connector 42 is received between the wings 44 of the component 40 and the lugs 60 are situated in front of the front edges of the wings 44, with a view to avoiding the wings 44 preventing the deformation of the lugs 60 when it is wished to be able to remove the arm 22.

In accordance with the teachings of the invention, the front face 68 of the component 40 is closed off by a safety fastener 74 also forming a housing cap.

The fastener 74 is a hollow piece moulded from plastics material in the form of a cap. It is articulated about a vertical axis V1 of the component and is also mounted so as to be able to move between a closed position of securing the connector 42 in the engaged position inside the hook-shaped end 32 illustrated in FIG. 2 and an open position allowing the disengagement of the connector 42.

The locking of the securing of the connector 42 is provided by the internal faces 77 of the vertical lateral walls 76 of the fastener 74 which extend along the external lateral faces 59 of the lugs 60. Thus the fastener 74 prevents the lugs 60 being deformed transversely towards the outside of the connector 42 and therefore the connector 42 cannot be disengaged from the hook 32.

The fastener 74 participates in the aesthetic appearance and aerodynamics of the whole. To this end, when the fastener 74 is in the closed position, the lateral faces 76 extend in line with the wings 44 of the component 40 so that their external lateral faces are flush with each other.

The articulation axis "V1" of the fastener 74 is situated level with the front edge of a wing 44 of the component 40. The articulation hinge can be produced by a cylindrical element 74 of the component 40 which is covered with an element forming a hook 80 of the fastener 74 comprising a recess complementary to the cylindrical element 78.

The immobilisation of the fastener 74 in the closed position is provided by a lug 82 of the fastener 74. The immobilisation lug 82, which extends longitudinally towards the rear from the rear flank of the lateral wall 76 opposite to the lateral face 76 receiving the element forming a hook 80. The lug 82 fits elastically in a housing 84 in the associated wing 44.

When a new blade must be mounted on the arm, the component 40 of the worn blade 24 is not kept but is also replaced with a component of the new blade. Thus each component can receive an indicator for defining when the blade is worn. This element is in general terms in the form of a tablet, referred to as an aging indicator 86, placed on an external face of a wing 44 of the component 40.

After the new blade is fitted, it is necessary to remove a protective film from the indicator in order to initialise the detection of aging. It is thus possible to provide for the fastener cap 74 to be closed originally and for its opening to require removal of the protective film.

The wiper 20 has been described as comprising a blade 24 of the "flat blade" type. It is not however limited to this embodiment and may comprise a standard blade 24 of the type in which the support structure 26 comprises a main yoke which carries secondary yokes. Thus, in the case of a standard blade 24, the component 40 is an element of the main yoke of the support structure 26.

It will be understood that the invention is not limited to this embodiment and that it is possible to use mechanical reversals or simple equivalents.

Thus the fastener 74 may be produced in one piece with the component 40. More precisely, the rear edge of a lateral face 76 of the fastener 74 is connected to the corresponding front edge of the component 40 by a thin strip of material which forms an articulation hinge of axis "V1".

The invention therefore enables to have a modular wiper mounting, that is to say, using standard arm and connector, it is possible to mount any type of wiper blade provided with a component in accordance with the invention, whether or not the blade is of the "flat blade" type. The invention also enables to have a protected mounting without risk of unexpected demounting of the blade.

What is claimed is:

1. A motor vehicle wiper of the type comprising a wiper blade mounted articulated about a transverse axis on the longitudinal front end of a wiper arm, of the type in which a mounting and articulation connector is interposed between the arm and a blade component, of the type in which the connector is engaged longitudinally from rear to front inside the front end of the arm which is curved longitudinally towards the rear in the form of a U, and in which the connector comprises at least one elastically deformable element for securing the connector in the engaged position inside the front end of the arm, and comprises two longitudinal vertical flanks which are designed to be received between two lateral wings of the blade component, characterized in that it comprises a safety fastener mounted so as to be able to move between a closed position in which it extends with regards to the securing element in order to prevent its elastic deformation and lock the connector in the engaged position in the arm, and an open position allowing the disengagement of the connector from the hook-shaped end of the arm.

2. The wiper according to claim 1, characterised in that the fastener is mounted movable with respect to the blade component.

3. The wiper according to claim 2, characterised in that the fastener is mounted articulated with respect to the blade component.

4. The wiper according to claim 3, characterised in that the fastener is mounted articulated about a substantially vertical axis of the blade component.

5. The wiper according to claim 4, characterised in that the articulation axis of the fastener is situated close to the front longitudinal end of one wing of the component.

6. The wiper according to claim 5, characterised in that the fastener is held in the closed position by elastic fitting together of complementary shapes.

7. The wiper according to claim 3, characterised in that the securing element is a lug which extends freely and longitudinally towards the front a front longitudinal end of one flank of the connector, and whose free end comprises a securing nose which extends transversely towards the inside of the connector and which extends with regard to the front face of the front longitudinal end of the arm when the connector is in the engaged position.

8. The wiper according to claim 3, characterised in that the fastener is held in the closed position by elastic fitting together of complementary shapes.

9. The wiper according to claim 4, characterised in that the fastener is held in the closed position by elastic fitting together of complementary shapes.

10. The wiper according to claim 2, characterised in that the fastener is held in the closed position by elastic fitting together of complementary shapes.

11. The wiper according to claim 2, characterised in that the securing element is a lug which extends freely and longitudinally towards the front from a front longitudinal end of one flank of the connector, and whose free end comprises a securing nose which extends transversely towards the inside of the connector and which extends with regard to the front face of the front longitudinal end of the arm when the connector is in the engaged position.

12. The wiper according to claim 11, characterised in that the fastener forms a cap which extends with regard to, and in a closed position, an external lateral face of the free end of the securing lug of the connector.

13. The wiper according to claim 2, characterised in that the component is an insert piece mounted on a support structure for a wiper rubber of the blade.

14. The wiper according to claim 2, characterised in that the component is a portion of a main yoke of an articulated support structure for a wiper rubber of the blade.

15. The wiper according to claim 2, characterised in that one of the wings of the component of the blade receives, on an external face, an indicator of the aging of the blade which is initially covered with a protective film which is removed, at least partially, automatically, when the fastener is opened.

16. The wiper according to claim 1, characterised in that the securing element is a lug which extends freely and longitudinally towards the front from a front longitudinal end of one flank of the connector, and whose free end comprises a securing nose which extends transversely towards the inside of the connector and which extends with regard to the front face of the front longitudinal end of the arm when the connector is in the engaged position.

17. The wiper according to claim 16, characterised in that the fastener forms a cap which extends with regard to, and in a closed position, an external lateral face of the free end of the lug of the connector.

18. The wiper according to claim 1, characterised in that the component is an insert piece mounted on a support structure for a wiper rubber of the blade.

19. The wiper according to claim 1, characterised in that the component is a portion of a main yoke of an articulated support structure for a wiper rubber of the blade.

20. The wiper according to claim 1, characterised in that one of the wings of the component of the blade receives, on an external face, an indicator of the aging of the blade which is initially covered with a protective film which is removed, at least partially, automatically, when the fastener is opened.

* * * * *